Figure 1:
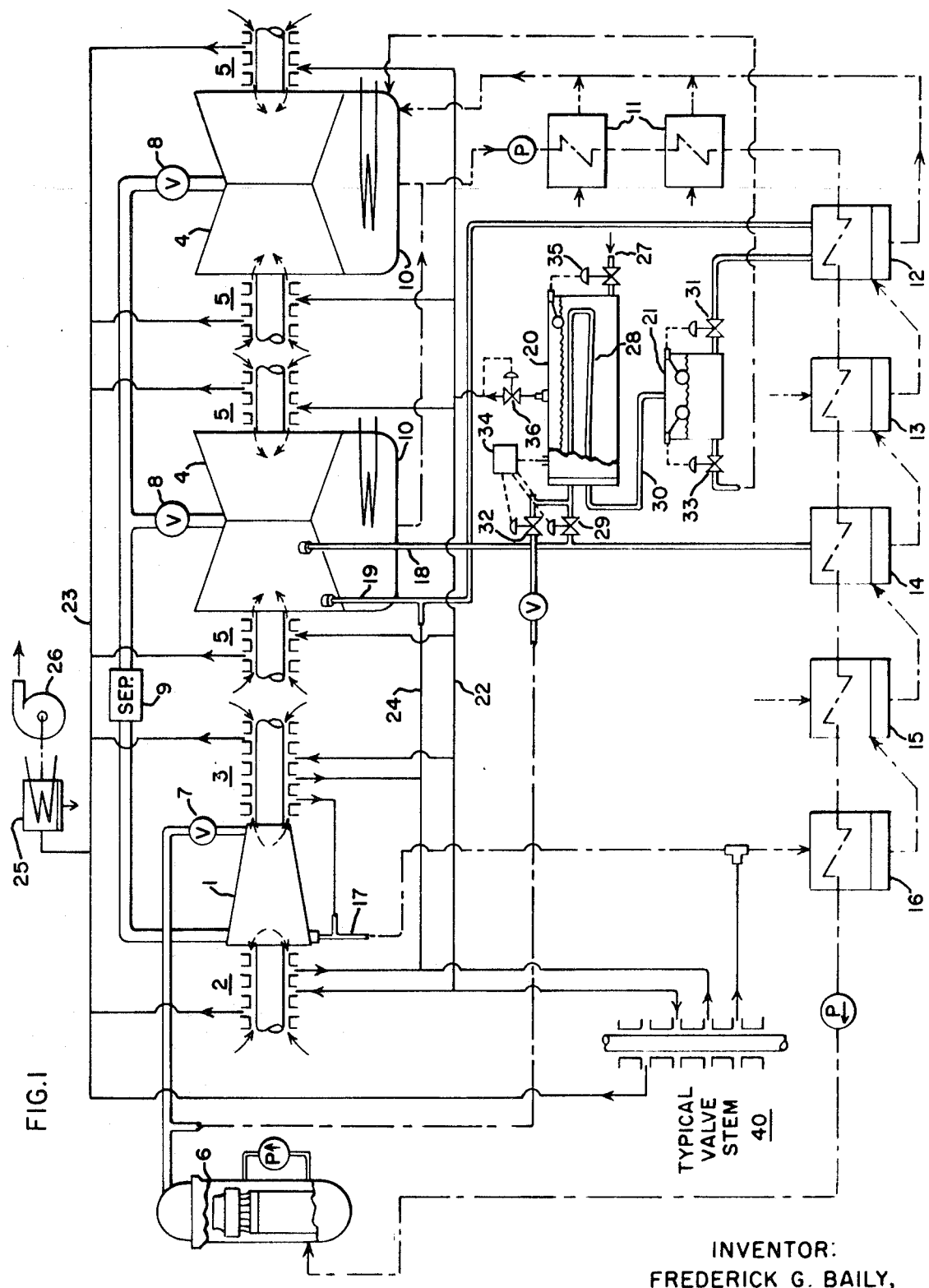

United States Patent

[11] 3,604,206

[72] Inventor  Frederick G. Baily
              Ballston Spa, N.Y.
[21] Appl. No. 749,077
[22] Filed     July 31, 1968
[45] Patented  Sept. 14, 1971
[73] Assignee  General Electric Company

[54] SHAFT-SEALING SYSTEM FOR NUCLEAR TURBINES
     5 Claims, 3 Drawing Figs.

[52] U.S. Cl. .................................................. 60/108,
                                                          277/15
[51] Int. Cl. .................................................. F01d
[50] Field of Search .......................................... 60/108,
                                                  67; 277/1, 15

Primary Examiner—Carroll B. Dority, Jr.
Attorneys—William C. Crutcher, Frank L. Neuhauser, Oscar B. Waddell and Melvin M. Goldenberg

ABSTRACT: A nonradioactive source of steam for sealing the shaft packings of turbines operating on steam subject to nuclear contamination is generated by a special steam seal evaporator. The nonradioactive steam is supplied to the high-pressure shaft packing chamber as a buffer between contaminated steam and the atmosphere, and prevents mixing of contaminated steam with air extracted from the packings. The evaporator is heated by steam extracted from the turbine for maximum cycle efficiency. Clean sealing steam is generated at a pressure above atmospheric and eliminates conventional steam seal regulator devices. The system eliminates radioactive contamination of the air drawn from the turbine packings, reducing the size of the station off-gas system.

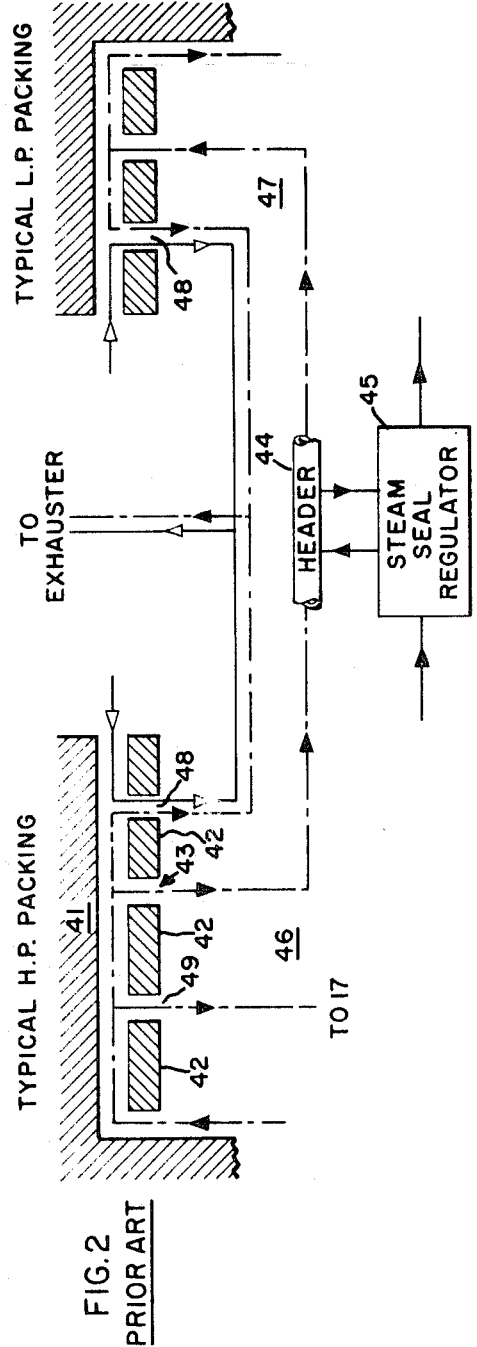
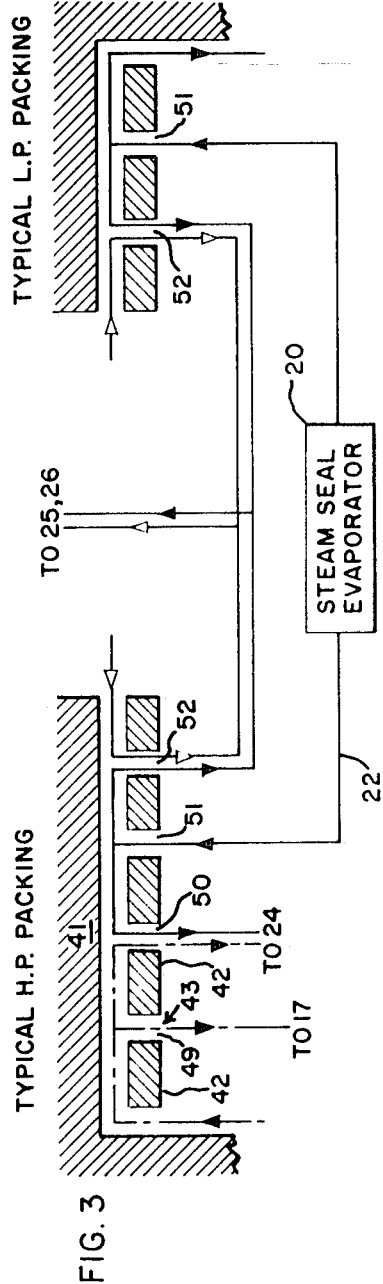
FIG. 2 PRIOR ART
FIG. 3

SHAFT-SEALING SYSTEM FOR NUCLEAR TURBINES

BACKGROUND OF THE INVENTION

A steam-sealing system is provided in steam turbine powerplants to prevent the leakage of steam along the turbine shaft into the atmosphere in the case of high-pressure packings, and to prevent the leakage of air along the shaft from the atmosphere into the turbine in the case of the low-pressure packings. In conventional systems, the high-pressure and low pressure packings receive steam from or contribute steam to a "steam seal header" which is held at a constant pressure by a "steam seal regulator." Since the header and high- and low-pressure packings are all interconnected, and since the makeup to the steam seal header is supplied by working steam, any contamination in the main steam flowing through the turbine is also present in the steam-sealing system.

In the case of nuclear turbines operating on steam from nuclear reactors of the open cycle type known as "boiling water" reactors, where the steam goes directly from the reactor to the turbine, the steam may contain a trace of radioactive, noncondensible gases from the reactor. These radioactive gases would be present in a conventional steam seal system as well. When air from the atmosphere is drawn in along the shaft packings, as is the usual practice, the leakoff steam from the packing is mixed with a much greater volume of air, possibly contaminating it with a trace of radioactive noncondensible gas. This large volume of air, although of very low radioactivity, must be treated as radioactive gas. Consequently, additional equipment may be required to treat large volumes of air which have been slightly contaminated by the steam-sealing system.

Accordingly, one object of the present invention is to provide an improved steam-sealing system for nuclear turbines operating on steam from the boiling water reactor.

A further object of the invention is to provide an improved sealing system utilizing "clean" steam as a buffer between the atmosphere and contaminated steam in the turbine.

Still another object of the invention is to provide an improved apparatus for supplying sealing steam to shaft packings of a turbine.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

FIG. 1 is a simplified schematic illustrating the essential elements of the steam sealing system for a nuclear turbine powerplant, FIG. 2 is a simplified diagram of a prior art-type of steam seal system, and FIG. 3 is a comparable simplified diagram of the present steam seal.

SUMMARY OF THE INVENTION

Briefly stated, the invention is practiced by providing a steam seal evaporator to generate clean sealing steam, using heat obtained from the main powerplant steam which may be contaminated. The clean steam is interposed in a shaft packing arrangement as a buffer and at a pressure slightly above atmospheric so that it flows into the contaminated steam system or flows as clean leakoff steam to be mixed with air and requiring no special treatment.

DESCRIPTION

Referring to FIG. 1 of the drawing, a typical nuclear steam turbine powerplant comprises a high-pressure turbine 1 having high-pressure shaft packings 2, 3 and one or more low-pressure turbines 4 having substantially identical low-pressure shaft packings 5. Packings 2, 3, 5 have inner ends communicating with the turbine sections and outer ends communicating with the atmosphere as indicated by the flow arrows.

Steam for turbines 1, 4 is generated by a nuclear reactor 6 of the boiling water type and its flow to the turbines is controlled by one or more control valves 7 and intermediate valves 8. Although the pressures, flows and number of turbine sections will vary with the particular powerplant, inlet pressure to turbine 1 may be on the order of 1,000 p.s.i. and exhaust pressure on the order of 200 p.s.i. After removal of moisture in separator 9, and possible reheating (not shown here), steam enters turbines 4 at a pressure on the order of 200 p.s.i. and exhausts to condensers 10 at a pressure on the order of 2 inches Hg. Abs., where it is condensed to feedwater.

The feedwater, indicated by dot-dash lines, may include passage through various heat recovery elements such as special auxiliary condensers 11, and includes passage through a series of feedwater heaters 12-16 of increasing shell pressure and supplied with steam removed from suitable extraction locations. Although in actuality there are numerous interstage extractions for various purposes, the ones shown which are material to the present invention are an extraction conduit 17 from the exhaust end of the high-pressure turbine and extraction conduits 18 and 19 from intermediate and low-pressure stages respectively of the low-pressure turbine. These are referred to hereinafter as high-pressure, intermediate pressure and low-pressure extraction conduits for purposes of differentiation, although it is understood that these are merely relative terms rather than designating any particular pressure. The only absolute pressure connotation that these terms have is that low-pressure extraction 19 is at a subatmospheric pressure roughly on the order of 5 p.s.i.a., this also being the shell pressure of the lowest feedwater heater 12. Feedwater is returned to reactor 6 to complete the closed cycle.

In accordance with the invention, a steam-sealing system with steam piping, shown in solid lines in FIG. 1, comprises a submerged tube evaporator 20, a drain tank 21, a sealing steam supply header 22, a leakoff steam exhaust header 23, a subatmospheric pressure header 24, a steam seal exhaust condenser 25 and a fan, or blower, 26 exhausting to the atmosphere.

The evaporator 20 is supplied with a clean or uncontaminated water supply via line 27, and serves to evaporate the water to supply clean sealing steam to header 22, In normal operation, heating coils 28 for the evaporator receive steam via valve 29 from intermediate pressure extraction conduit 18. The coils 28 drain via line 30 to tank 21. From there the condensed fluid drains via valve 31 to the low pressure feedwater heater 12.

Under alternate modes of operation, the heating coils 28 may also be supplied with main throttle steam via valve 32. Alternate drainage is obtained via a "high level" valve 33 provided on drain tank 21 and connected to the main condenser.

In order to control the heat energy supplied to submerged coils 38 and to obtain the heat energy under the most economical cycle conditions, a pressure-sensitive control 34 causes heating steam to be normally admitted via valve 29 from extraction conduit 18, but when the extraction pressure is insufficient, such as during startup, controller 34 causes the deficiency to be made up from main steam via valve 32.

An automatic float valve 35 controls the level of clean water supplied to the steam seal evaporator 20. The generated steam is supplied via an automatic pressure control valve 36 to header 22, responsive to pressure in the header. Valve 36 is controlled to keep the supply header pressure at a constant value slightly above atmospheric pressure, i.e., on the order of 19 p.s.i.a.

The various steam seal headers 5 so connected to high-pressure packings 2, 3 and low-pressure packings 5 so that the steam flows as indicated by the arrows and to be more clearly explained in connection with FIGS. 2 and 3. However, it is noted that the system is not limited to rotating shaft packings, but is applicable also to valve stem packings such as would be found along the stems of valves 7 and 8 to prevent steam leakage at these locations.

A typical stem segment is indicated at 40 in FIG. 1. The upper end is at atmospheric pressure, and the lower end is exposed to the internal steam pressure. It is believed that no further explanation of the sealing system as applied to a valve stem is necessary, since its operation as described more particularly in connection with FIGS. 2 and 3 is essentially the same as the shaft-packing system, and for the same purpose.

Referring to FIGS. 2 and 3 of the drawing, a prior art sealing system for typical high-pressure and low-pressure packings is illustrated in FIG. 2. The improved sealing system is comparably arranged in FIG. 3. The drawings of FIGS. 2 and 3 are stylized in order to more easily illustrate the operation, but they will be understood by those skilled in the art. The portions along the top, such as 41, represent the turbine shafts (or valve stems), while the small rectangles such as 42 represent packing rings, either smooth or having a series of annular teeth or a labyrinth. Each packing ring 42 forms a close clearance with the turbine shaft or valve stem portions. The spaces 43 between the packing rings 42 represent suitable leakoff or supply chambers.

Air flow is indicated by the open arrowheads, while steam flow is indicated by the solid arrowheads. The high-pressure packings on the left necessitate a net flow of leakage steam out of the unit along the shaft, while the low pressure packings on the right necessitate a net flow of leakage steam along the shaft into the unit. In the diagrams, the dot-dash lines represent main steam from the powerplant which may contain contaminates such as radioactive noncondensible gas from the boiling water reactor. In FIG. 3, the separate steam seal flow of buffer steam from the steam seal evaporator 20 is indicated in solid lines.

Referring first to a conventional steam seal system of FIG. 2 for a steam powerplant of this type, a steam seal header 44 was connected to a steam seal regulator 45 and the steam seal header was also connected to the high-pressure packing 46 and the low-pressure packing 47. The high-pressure packing contributed sealing steam to header 44 at high loads. Low-pressure packings 47 required steam from the header at all loads. At light loads, the sealing steam deficit was made up with throttle steam admitted to leader 44 from regulation 45. At high loads excess steam was dumped to a suitable disposal point in the system such as a low-pressure feedwater heater, by regulator 45. Air from the powerplant station was drawn in along the shaft from the outer end of the packing by a moderately low subatmospheric pressure maintained by an exhauster consisting of elements such as 25, 26 (see FIG. 1). The station air was mixed in the steam packing chambers 48 with leakage steam passing along the shaft in the opposite direction. A relatively large volume of air was thus mixed with the main steam leakoff from the packing. If the main steam were contaminated, the mixture passing to the exhauster had to be treated as contaminated also, even though it was greatly diluted by air.

Referring to FIG. 3 of the drawing, the invention is seen to interpose clean sealing steam between the contaminated steam in the turbine and the station in the case of the high-pressure packing, and to supply clean sealing steam to the low-pressure packing. Specifically, the high-pressure packing comprises a high-pressure return chamber 49, a low-pressure return chamber 50, a clean steam supply chamber 51, and a clean leakoff chamber 52.

Similarly, the low-pressure packing comprises a clean steam supply chamber 51 and a clean leakoff chamber 52 performing the same functions as in the high-pressure packing.

In both prior art (FIG. 2) and the present invention (FIG. 3), the high-pressure return chamber 49 is connected to high-pressure extraction line 17, in the present case, at about 200 p.s.i. In the present invention, the low-pressure return chamber 50 is connected via header 24 to low-pressure extraction line 19 leading to the lowest feedwater heater 12 at subatmospheric pressure (about 5 p.s.i.a. in the present case). Thus, radioactive steam at main throttle pressure of 1,00 p.s.i. entering the inner end of the packing from the left will flow along the shaft and leave the packing via return chambers 49, 50.

The clean steam supply chambers 51 of both high pressure and low pressure packings are supplied with steam from the steam seal evaporator at a pressure slightly above atmospheric. The clean leakoff chambers 52 are maintained at a pressure slightly below atmospheric by blower 26. Thus clean steam from chambers 51 will leak in both directions along the shaft to the subatmospheric chambers on either side. In the case of the high-pressure packing, a portion of the sealing steam will flow toward the turbine as far as chamber 50. The other portion will be mixed with station air and exhausted through the condenser 25 and blower 26.

In the case of the low-pressure packing, the steam flowing toward the turbine enters the main steam flow, while the leakoff steam from the chamber 32 is exhausted to the steam seal condenser.

OPERATION

The operation of the system shown in FIG. 1 of the drawing is as follows: The sealing steam generated by steam seal evaporator 20 and supplied to header 22 is completely clean and independent of the main steam flow in the turbine. It is generated, however, by working steam passing through the heating coils 28 suitably disposed to receive steam from an intermediate pressure extraction line. The condensed extraction steam flows to the lowest feedwater heater held at subatmospheric pressure by a low-pressure steam extraction line.

Thus the suitable selection of two extraction pressures between which to place the steam seal evaporator 20 can be used to determine a relatively high thermodynamic efficiency of the sealing system with respect to the overall cycle. In addition, the supply of steam to the heating coils 28 can be augmented by throttle steam under unusual circumstances by proper controls.

The introduction of a clean sealing steam as a buffer between the station air and the main steam flow provides the ability to treat leakoff steam from the shaft packings and the valve stem packings in the manner previously accorded to leakoff steam from fossil fired steam turbine powerplants without other special precautions.

While there is shown what is considered at present to be the preferred embodiment of the invention, it is of course understood that various other modifications may be made therein, and it is intended to cover in the appended claims all such modifications as fall within the true spirit and scope of the invention.

What I claim is:

1. In a steam turbine subject to receiving contaminated steam in a closed steam and feedwater cycle and having at least one high-pressure packing for sealing a turbine section operating above atmospheric pressure and at least one low-pressure packing for sealing a turbine section operating below atmospheric pressure, said packings defining a plurality of axially spaced chambers between groups of packing teeth forming close clearances with the a, each of said packings having an outermost end communicating with the atmosphere through one of said clearances, a noncontaminating shaft seal system for one of said packings comprising:

first means including an exhauster system maintaining a first clean leakoff packing chamber at subatmospheric pressure adjacent said outermost end of the packing, and communicating with the atmosphere, second means maintaining a second steam return chamber at a subatmospheric pressure, said steam return chamber also communicating with the turbine cycle steam, and third means generating clean sealing steam at a pressure above atmospheric and supplying it to a third packing chamber between the first and second chambers, said clean steam generating means comprising an evaporator supplied with uncontaminated water and heated by steam extracted from said closed steam and feedwater cycle, whereby a portion of the generated clean steam flows toward the turbine and a portion is drawn along with air leaking inward from the outermost end of the packing through said exhauster system.

2. The combination according to claim 1, wherein said evaporator comprises a submerged coil connected at one end to a steam extraction line and at the other end to a tank draining to a lower pressure point in the steam and feedwater cycle.

3. The combination according to claim 1, wherein said steam return chamber is disposed in said low-pressure packing and communicates directly with said low-pressure turbine section.

4. In a steam turbine subject to receiving radioactive steam from a boiling water reactor and in a closed cycle and having shaft packing defining a plurality of axially spaced packing chambers between groups of packing teeth forming close clearances with the shaft, a noncontaminating shaft sealing system comprising:
  at least one high pressure packing having at least the following packing chambers in succession from the outer end of the packing,
    a. a subatmospheric clean steam leakoff chamber,
    b. a clean steam supply chamber maintained above atmospheric pressure,
    c. a subatmospheric pressure contaminated steam return chamber,
  at least one low-pressure packing having at least the following packing chambers in succession from the outer end of the packing,
    a. a subatmospheric clean steam leakoff chamber,
    b. a clean steam supply chamber maintained above atmospheric pressure,
  a submerged tube steal seal evaporator having a clean water supply source,
  first conduit means arranged to supply said submerged tube evaporator with extraction steam from the turbine,
  a drainage tank for collecting condensed water from said submerged tube evaporator,
  means controlling the flow of steam from said evaporator to said clean steam supply chambers and arranged to hold the pressure therein substantially constant,
  means connecting said return chamber of said high-pressure packing to a subatmospheric point in the cycle, and
  a leakoff steam exhaust system connected to withdraw a mixture of air and steam from said clean leakoff chambers and vented to the atmosphere.

5. The combination according to claim 1, wherein seal system for said packing also includes a high-pressure steam return chamber disposed adjacent to and on the turbine section side of said second steam return chamber, said high-pressure chamber being connected to a point in said closed steam and feedwater cycle to maintain the pressure therein between that of said second steam return chamber and that of the section.